United States Patent
Kuwajima et al.

(10) Patent No.: US 7,432,000 B2
(45) Date of Patent: Oct. 7, 2008

(54) MAGNETIC RECORDING MEDIUM UTILIZING A BACK COAT LAYER CONTAINING A CARBOXYLIC ACID AMINE SALT AND A PHOSPHATE AMINE SALT

(75) Inventors: Takayoshi Kuwajima, Tokyo (JP); Katsuhiko Yamazaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/612,755

(22) Filed: Dec. 19, 2006

(65) Prior Publication Data
US 2007/0141402 A1 Jun. 21, 2007

(30) Foreign Application Priority Data
Dec. 21, 2005 (JP) .............................. 2005-367486

(51) Int. Cl.
*G11B 5/716* (2006.01)
(52) U.S. Cl. .................................................. 428/841.2
(58) Field of Classification Search .................. 428/844
See application file for complete search history.

(56) References Cited

U.S. PATENT DOCUMENTS

| | | | | |
|---|---|---|---|---|
| 4,701,375 | A * | 10/1987 | Nishimatsu et al. | 428/336 |
| 5,368,949 | A * | 11/1994 | Ushimaru et al. | 428/840.5 |
| 5,543,219 | A * | 8/1996 | Elwakil | 428/402.24 |
| 6,653,001 | B2 * | 11/2003 | Murao et al. | 428/845 |
| 7,011,900 | B2 * | 3/2006 | Seki et al. | 428/845.5 |
| 7,157,163 | B2 * | 1/2007 | Yajima et al. | 428/839.6 |
| 7,208,237 | B2 * | 4/2007 | Seki et al. | 428/842.3 |
| 2002/0155324 | A1 * | 10/2002 | Murao et al. | 428/694 SL |
| 2004/0197605 | A1 * | 10/2004 | Seki et al. | 428/694 TR |
| 2004/0207955 | A1 * | 10/2004 | Seki et al. | 360/135 |
| 2004/0209121 | A1 * | 10/2004 | Yajima et al. | 428/694 ST |
| 2007/0026264 | A1 * | 2/2007 | Kuwajima et al. | 428/840.2 |
| 2007/0141402 | A1 * | 6/2007 | Kuwajima et al. | 428/845.3 |

FOREIGN PATENT DOCUMENTS

| | | |
|---|---|---|
| JP | 2001-344737 | 12/2001 |
| JP | 2002-312922 | 10/2002 |
| JP | 2002312922 A * | 10/2002 |

OTHER PUBLICATIONS

Disparlon For Water born coatings, Kusumoto Cheicals, Ltd., date unknown.*
Disparlon For Pigments/Dispersants, Kusumoto Cheicals, Ltd., date unknown.*
Disparlon DA-325, Kusumoto Cheicals, Ltd., date unknown.*
U.S. Appl. No. 11/958,036, filed Dec. 17, 2007, Kuwajima, et al.

* cited by examiner

*Primary Examiner*—Holly Rickman
*Assistant Examiner*—Gary Harris
(74) *Attorney, Agent, or Firm*—Oblon, Spivak, McClelland, Maier & Neustadt, P.C.

(57) ABSTRACT

The present invention provides a magnetic recording medium which has a back coat layer excellent in surface smoothness and durability and is excellent in electromagnetic conversion property. A magnetic recording medium, comprising at least a non-magnetic support, a lower non-magnetic layer on one surface of the non-magnetic support, an upper magnetic layer on the lower non-magnetic layer, and a back coat layer on the other surface of the non-magnetic support, wherein the lower non-magnetic layer contains at least carbon black, a non-magnetic inorganic powder other than carbon black, and a binder resin material, the upper magnetic layer contains at least a ferromagnetic powder, and a binder resin material, and the back coat layer contains at least carbon black, a non-magnetic inorganic powder other than carbon black, a carboxylic acid amine salt, a phosphate amine salt, and a binder resin material.

11 Claims, No Drawings

MAGNETIC RECORDING MEDIUM UTILIZING A BACK COAT LAYER CONTAINING A CARBOXYLIC ACID AMINE SALT AND A PHOSPHATE AMINE SALT

BACKGROUND OF THE INVENTION

1. Field of the Invention

The present invention relates to a magnetic recording medium, more specifically, to a magnetic recording medium which has a back coat layer excellent in surface smoothness and durability and is excellent in electromagnetic conversion property.

2. Disclosure of the Related Art

Conventionally, magnetic recording media have a magnetic layer on one surface of a non-magnetic support, and have a back coat layer on the other surface of the non-magnetic support in order to improve the running durability thereof and others.

In recent years, the recording density of magnetic recording medium has been desired to be made high in order to cope with an increase in the quantity of recording data. In order to make the recording density of the medium higher, the recording wavelength thereof has been made shorter and the magnetic layer has been made thinner. As the recording wavelength is made shorter, the magnetic layer surface is required to be made smoother from the viewpoint of spacing loss.

In the case that the magnetic layer is made thin, the surface roughness of the support is reflected on the surface of the magnetic layer so that the smoothness of the magnetic layer surface is damaged. Consequently, the electromagnetic conversion property of the magnetic layer deteriorates. For this reason, a non-magnetic layer is formed as an undercoat layer on the surface of the support, and then the magnetic layer is formed on this non-magnetic layer.

Japanese Laid-Open Patent Publication No. 2001-344737 discloses that, about a magnetic recording medium, a non-magnetic layer contains carbon black treated with at least one kind of anionic surfactant selected from carboxylic acid amine salts and phosphate amine salts.

Japanese Laid-Open Patent Publication No. 2002-312922 discloses that, about a magnetic recording medium, a magnetic layer contains ferromagnetic powder treated with at least one kind of anionic surfactant selected from carboxylic acid amine salts and phosphate amine salts.

SUMMARY OF THE INVENTION

In order to maintain the smoothness of the surface of the magnetic layer, it is necessary to heighten the surface smoothness and the durability of the back coat layer, which contacts the surface of the magnetic layer when the magnetic recording medium is wounded.

An object of the present invention is to provide a magnetic recording medium which has a back coat layer excellent in surface smoothness and durability and is excellent in electromagnetic conversion property.

The present inventors have found out that when both of a carboxylic acid amine salt and a phosphate amine salt are incorporated into a coating material for a back coat layer, the stability with time of this back coat layer coating material is improved and the surface smoothness and the durability of the back coat layer are improved.

The present invention comprises the followings:

(1) A magnetic recording medium, comprising at least a non-magnetic support, a lower non-magnetic layer on one surface of the non-magnetic support, an upper magnetic layer on the lower non-magnetic layer, and a back coat layer on the other surface of the non-magnetic support, wherein the lower non-magnetic layer contains at least carbon black, a non-magnetic inorganic powder other than carbon black, and a binder resin material, the upper magnetic layer contains at least a ferromagnetic powder, and a binder resin material, and the back coat layer contains at least carbon black, a non-magnetic inorganic powder other than carbon black, a carboxylic acid amine salt, a phosphate amine salt, and a binder resin material.

(2) The magnetic recording medium according to (1), wherein the back coat layer contains 2 to 10 parts by mass of the carboxylic acid amine salt and 1 to 8 parts by mass of the phosphate amine salt, with respect to 100 parts by mass of the total of carbon black and the non-magnetic inorganic powder other than carbon black which constitute the back coat layer.

(3) The magnetic recording medium according to (1) or (2) wherein the carboxylic acid amine salt has a weight-average molecular weight of 10,000 to 50,000 and the phosphate amine salt has a weight-average molecular weight of 10,000 to 50,000.

(4) The magnetic recording medium according to any one of (1) to (3), wherein the carboxylic acid amine salt has an acid value of 10 to 50 KOHmg/g and an amine value of 10 to 50 KOHmg/g, and the phosphate amine salt has an acid value of 10 to 50 KOHmg/g and an amine value of 10 to 50 KOHmg/g.

According to the present invention, the magnetic recording medium comprises, in the back coat layer, both of a carboxylic acid amine salt and a phosphate amine salt. When both of the carboxylic acid amine salt and the phosphate amine salt are incorporated into a coating material for the back coat layer, the dispersion properties of the back coat layer coating material and the stability with time thereof are improved. In this way, a good coating film of the back coat layer is formed, so that the surface smoothness and the durability of the back coat layer are improved. As a result, in the state that the magnetic recording medium is wounded, the smoothness of the magnetic layer surface contacting the back coat layer surface is maintained, and the magnetic recording medium excellent in electromagnetic conversion property is provided.

DETAILED DESCRIPTION OF THE INVENTION

The magnetic recording medium of the present invention comprises at least a non-magnetic support, a lower non-magnetic layer on one surface of the non-magnetic support, an upper magnetic layer on the lower non-magnetic layer, and a back coat layer on the other surface of the non-magnetic support. For example, the thickness of the lower non-magnetic layer is from 0.3 to 2.5 µm, the thickness of the upper magnetic layer is from 0.03 to 0.30 µm, and the thickness of the back coat layer is from 0.1 to 1.0 µm. A lubricant coating film, various coating films for protecting the magnetic layer, and the like may be formed on the upper magnetic layer if necessary. An undercoat layer (adhesive layer) may be formed on the surface of the non-magnetic support on which the magnetic layer is to be formed, in order to improve adhesion of the coating film and the non-magnetic support, and other effect.

[Lower Non-Magnetic Layer]

The lower non-magnetic layer comprises at least carbon black, a non-magnetic inorganic powder other than carbon black, and a binder resin material.

The carbon black contained in the lower non-magnetic layer may be furnace black for rubber, thermal black for rubber, black for color, acetylene black or the like. It is preferred that the specific area thereof is from 5 to 600 $m^2/g$, the DBP oil absorption thereof is from 30 to 400 mL/100 g, and the particle diameter thereof is from 10 to 100 nm. For the carbon black which can be used, specifically, "carbon black guide book" edited by the Carbon Black Association of Japan can be referred to.

The amount of the carbon black incorporated into the lower non-magnetic layer is from 5 to 30% by mass, preferably from 10 to 25% by mass of the lower non-magnetic layer.

The non-magnetic inorganic powder other than carbon black, which is contained in the lower non-magnetic layer, is an inorganic powder made of, for example, α-iron oxide (α-$Fe_2O_3$), α-iron hydroxide (α-FeO(OH)), $CaCO_3$, titanium oxide, barium sulfate, or α-$Al_2O_3$. It is preferred that at least one of α-iron oxide and α-iron hydroxide out of these materials is contained in the layer. It is also preferred that α-iron oxide and α-iron hydroxide are each acicular.

The blend ratio by mass of carbon black to the non-magnetic inorganic powder other than carbon black (carbon black/the non-magnetic inorganic powder other than carbon black (mass ratio)) is preferably from 95/5 to 5/95. If the percentage of blended carbon black is less than 5% by mass, a problem about surface electrical resistance may be caused: If the percentage of the blended non-magnetic inorganic powder other than carbon black is less than 5% by mass, the surface smoothness of the lower non-magnetic layer may deteriorate and the mechanical strength thereof may lower. The deterioration in the surface smoothness of the lower non-magnetic layer causes a deterioration in the surface smoothness of the upper magnetic layer.

The binder resin material of the lower non-magnetic layer may be a combination that is appropriately selected from thermoplastic resins, thermosetting or thermoreactive resins, radiation (electron beam or ultraviolet ray) curable resins and other resins in accordance with the property of the medium or conditions for the production process thereof. Of these resins, electron beam curable resins are preferred. More preferred is a combination of electron beam curable vinyl chloride copolymer and polyurethane resin described below.

The vinyl chloride copolymer is preferably one having a vinyl chloride content of 50 to 95% by mass, and is more preferably one having a vinyl chloride content of 55 to 90% by mass. The average degree of polymerization thereof is preferably from about 100 to 500. Particularly, preferable is a copolymer made from vinyl chloride and a monomer having an epoxy (glycidyl) group. The vinyl chloride copolymer is modified to be electron beam sensitive by introducing (meth) acrylic double bonds, or the like, using known techniques.

The polyurethane resin, which is used together with the vinyl chloride resin, is a generic name given to resins obtained by reaction of hydroxy group containing resins, such as polyester polyol and/or polyether polyol, with polyisocyanate-containing compounds. The number-average molecular weight thereof is from about 5,000 to 200,000, and the Q value (i.e., the mass-average molecular weight/the number-average molecular weight) thereof is from about 1.5 to 4. The polyurethane resin is modified to be electron beam sensitive by introducing (meth)acrylic double bonds using known techniques.

Besides the vinyl chloride copolymer and the polyurethane resin, known various resins may be incorporated into the non-magnetic layer at an amount in the range of 20% or less by mass of all the binders in this layer.

In order to improve the crosslinking efficiency of the electron beam curable binder resin used in the present invention, it is preferred to use, as a crosslinking agent, an electron beam curable polyfunctional monomer, preferably a polyfunctional (meth)acrylate.

The polyfunctional (meth)acrylate monomer is not particularly limited, and examples thereof include ethylene glycol di(meth)acrylate, diethylene glycol di(meth)acrylate, polyethylene glycol di(meth)acrylate, 1,6-hexane glycol di(meth) acrylate, pentaerythritol tetra(meth)acrylate, trimethylolpropane tri(meth)acrylate, and trimethylolpropane di(meth) acrylate.

As the polyfunctional (meth)acrylate monomer, diacrylate adducts described in the following can be preferably used:

a diacrylate adduct (IPDI-2HPA) having a structure wherein hydroxypropyl acrylate (HPA) is added to each of two isocyanate groups in isophorone diisocyanate (IPDI) through a hydroxy group, a diacrylate adduct (IPDI-2HEA) having a structure wherein hydroxyethyl acrylate (HEA) is added to each of two isocyanate groups in isophorone diisocyanate (IPDI) through a hydroxy group, and a diacrylate adduct (TDI-2HPA) having a structure wherein hydroxypropyl acrylate (HPA) is added to each of two isocyanate groups in tolylene 2,4-diisocyanate (TDI) through a hydroxy group.

In order to obtain an improved crosslinking efficiency, it is advisable to use the electron beam curable polyfunctional monomer at an amount of 1 to 50 parts by mass, preferably 5 to 40 parts by mass with respect to 100 parts by mass of the total of the electron beam curable binder resin and the electron beam curable polyfunctional monomer.

The content of the binder resin used in the lower non-magnetic layer is preferably from 10 to 100 parts by mass, more preferably from 12 to 30 parts by mass with respect to 100 parts by mass of the total of the carbon black and the non-magnetic inorganic powder other than the carbon black in the lower non-magnetic layer. If the content of the binder is too small, the ratio of the binder resin in the lower non-magnetic layer lowers so that a sufficient coating film strength cannot be obtained. If the content of the binder is too large, the medium, when being made into a tape, is easily warped along the width direction of the tape. Consequently, the state of contact between the tape and a head tends to get bad.

It is preferred that the lower non-magnetic layer comprises a lubricant if necessary. The lubricant may be saturated or unsaturated, and may be a known lubricant, examples of which include fatty acids such as stearic acid and myristic acid; fatty acid esters such as butyl stearate and butyl palmitate; and sugars. These may be used alone or in a mixture of two or more thereof. It is preferred to use a mixture of two or more fatty acids having different melting points, or a mixture of two or more fatty acid esters having different melting points. This is because it is necessary to supply lubricants adapted to all temperature environments in which the magnetic recording medium is used onto the surface of the medium without interruption.

The lubricant content in the lower non-magnetic layer may be appropriately adjusted in accordance with purpose, and is preferably from 1 to 20% by mass of the total mass of the carbon black and the non-magnetic inorganic powder other than the carbon black in the lower non-magnetic layer.

A coating material for forming the lower non-magnetic layer is prepared by adding an organic solvent to the above-mentioned individual components and subjecting the resultant to mixing, stirring, kneading, dispersing and other treatments in a known manner. The used organic solvent is not limited to any especial kind, and may be appropriately selected from various solvents such as ketone solvents (such as methyl ethyl ketone (MEK), methyl isobutyl ketone, and cyclohexane) and aromatic solvents (such as toluene). These may be used alone or in combination of two or more thereof. The amount of the added organic solvent is set into the range of about 100 to 900 parts by mass with respect to 100 parts by mass of the total of the carbon black, the various inorganic powder(s) other than the carbon black, the binder resin, and polyfunctional monomer.

The thickness of the lower non-magnetic layer is usually from 0.3 to 2.5 μm, preferably from 0.3 to 2.3 μm. If the non-magnetic layer is too thin, the layer is easily affected by the surface roughness of the non-magnetic support so that the surface smoothness of the non-magnetic layer deteriorates and, also, the surface smoothness of the magnetic layer deteriorates easily. Consequently, the electromagnetic conversion property of the magnetic layer tends to deteriorate. Also, too thin a non-magnetic layer leads to an increased light transmittance, causing problems when medium end is detected by the changes in the light transmittance. On the other hand, making a non-magnetic layer thicker than a certain thickness would not correspondingly improve the performance of the magnetic recording medium.

[Upper Magnetic Layer]

The upper magnetic layer comprises at least a ferromagnetic powder and binder resin materials.

In the present invention, the ferromagnetic powder is preferably a magnetic metal powder or a planar hexagonal fine powder. The magnetic metal powder preferably has a coercive force Hc of 118.5 to 278.5 kA/m (1500 to 3500 Oe), a saturation magnetization σs of 70 to 160 $Am^2/kg$ (emu/g), an average major axis length of 0.03 to 0.1 μm, an average minor axis length of 8 to 20 nm, and an aspect ratio of 1.2 to 20. The Hc of the medium produced by use of the magnetic metal powder is preferably from 118.5 to 278.5 kA/m (1500 to 3500 Oe). The planar hexagonal fine powder preferably has a coercive force Hc of 79.6 to 278.5 kA/m (1000 to 3500 Oe), a saturation magnetization σs of 40 to 70 $Am^2/kg$ (emu/g), an average planar particle size of 15 to 80 nm, and a plate ratio of 2 to 7. The Hc of the medium produced by use of the planar hexagonal fine powder is preferably from 94.8 to 318.3 kA/m (1200 to 4000 Oe).

It is advisable that the magnetic layer comprises the ferromagnetic powder in an amount of about 70 to 90% by mass of the layer. If the content of the ferromagnetic powder is too large, the content of the binder decreases so that the surface smoothness deteriorates easily by calendering. On the other hand, if the content of the ferromagnetic powder is too small, a high reproducing output cannot be obtained.

The binder resin material for the upper magnetic layer is not particularly limited, and the following may be used: a combination that is appropriately selected from thermoplastic resins, thermosetting or thermoreactive resins, radiation (electron beam or ultraviolet ray) curable resins and other resins in accordance with the property of the medium or conditions for the production process thereof.

The content of the binder resin used in the upper magnetic layer is preferably from 5 to 40 parts by mass, more preferably from 10 to 30 parts by mass with respect to 100 parts by mass of the ferromagnetic powder. If the content of the binder is too small, the strength of the magnetic layer lowers so that the running durability of the medium deteriorates easily. On the other hand, if the content of the binder is too large, the content of the ferromagnetic powder lowers so that the electromagnetic conversion property tends to deteriorate.

The upper magnetic layer further contains an abrasive having a Mohs hardness of 6 or more, such as α-alumina (Mohs hardness: 9), for the purposes of increasing the mechanical strength of the magnetic layer and preventing clogging of the magnetic head. Such an abrasive usually has an indeterminate form, causes the magnetic head to be prevented from clogging, and causes the strength of the coating film to be improved.

The average particle diameter of the abrasive is, for example, from 0.01 to 0.2 μm, preferably from 0.05 to 0.2 μm. If the average particle diameter of the abrasive is too large, then the projections from the surface of the magnetic layer become significant, causing a decrease in the electromagnetic conversion property, an increase in the drop-outs, an increase in the head wear, and the like. If the average particle diameter of the abrasive is too small, then the projections from the surface of the magnetic layer will become small, leading to insufficient prevention of clogged heads.

The average particle diameter is usually measured with a transmission electron microscope. The content of the abrasive may be from 3 to 25 parts by mass, preferably from 5 to 20 parts by mass with respect to 100 parts by mass of the ferromagnetic powder.

If necessary, various additives may be added to the magnetic layer, examples of the additives including dispersants such as a surfactant, and lubricants such as higher fatty acid, fatty acid ester, and silicone oil.

A coating material for forming the upper magnetic layer is prepared by adding an organic solvent to the above-mentioned individual components and subjecting the resultant to mixing, stirring, kneading, dispersing and other treatments in a known manner. The organic solvent to be used is not limited to any especial kind, and may be the same as used in the lower non-magnetic layer.

The thickness of the upper magnetic layer is preferably from 0.03 to 0.30 μm, more preferably from 0.05 to 0.25 μm. If the magnetic layer is too thick, the self-demagnetization loss or thickness loss thereof increases.

The center line average roughness (Ra) of the upper magnetic layer surface is preferably from 1.0 to 5.0 nm, more preferably from 1.0 to 4.0 nm. If the Ra is less than 1.0 nm, the surface is too smooth so that the running stability deteriorates. As a result, troubles are easily caused during running of the recording medium. On the other hand, if the Ra is more than 5.0 nm, the magnetic layer surface gets rough. As a result, the electromagnetic conversion properties of the magnetic recording medium, such as the reproducing output thereof, deteriorate in a reproducing system using an MR head.

[Back Coat Layer]

The back coat layer is formed to improve the running stability of the recording medium, prevent the electrification of the magnetic layer, or attain some other purpose. Since the surface of the back coat layer contacts the surface of the magnetic layer in the state that the tape is wounded, it is necessary to heighten the smoothness of the back coat layer surface and the running durability thereof in order to maintain the smoothness of the magnetic layer surface.

Hitherto, a back coat layer has been formed by applying a back coat layer coating material comprising, for example, carbon black, a non-magnetic inorganic powder other than carbon black, and a binder resin onto the back surface of a non-magnetic support. About the back coat layer coating material, a rise in the viscosity with time thereof is observed. Thus, there arises a problem such that gloss falls on the surface of a coating film formed by use of the back coat layer coating material undergoing a lapse of time after the preparation of the coating material. In many cases, nitrocellulose is used as a binder resin of the back coat layer in order to keep the shape of the medium to make the magnetic layer side of the medium convex, or in order to make the running durability high. When the back coat layer coating material contains nitrocellulose, a rise in the viscosity or a fall in the gloss is remarkably observed. If the stability with time of the back coat layer coating material is bad, the application properties of this material deteriorate. Thus, the surface smoothness of the back coat layer formed by applying the coating material deteriorates. When the surface smoothness of the back coat layer deteriorates, surface irregularities in the back coat layer are transferred to the surface of the magnetic layer in the state that the tape is wounded. Accordingly, the smoothness of the magnetic layer surface falls so that the error rate of the recording medium deteriorates.

Thus, in order to improve the stability with time of a back coat layer coating material in the present invention so as to improve the surface smoothness and the durability of the resultant back coat layer, both of a carboxylic acid amine salt and a phosphate amine salt are incorporated into the back coat layer coating material. In other words, the back coat layer comprises at least carbon black, a non-magnetic inorganic powder other than carbon black, a carboxylic acid amine salt, a phosphate amine salt, and a binder resin material.

Carbon black contained in the back coat layer may be the same carbon black as described in the item of the lower non-magnetic layer. It is preferred to use, in the back coat layer, both of carbon black having a relatively large particle diameter of 50 to 150 nm and carbon black having a relatively small particle diameter of 13 to 30 nm, in order to attain running stability. In this case, it is advisable to set the ratio by mass of the carbon black having a relatively large particle diameter to the carbon black having a relatively small particle diameter into the range of about 5/95 to 20/80.

The blended amount of carbon black is from 30 to 80% by mass of the back coat layer, preferably from 35 to 70% by mass thereof.

Besides carbon black, various non-magnetic inorganic powders are used in the back coat layer in order to control the mechanical strength. Examples of the inorganic powder include $\alpha$-$Fe_2O_3$, $CaCO_3$, titanium oxide, barium sulfate, or $\alpha$-$Al_2O_3$.

The blend ratio by mass of carbon black to the non-magnetic inorganic powder other than carbon black is preferably from 70/30 to 95/5. If the percentage of blended carbon black is less than 70% by mass, the surface electrical resistance of the back coat layer becomes high so that dirt and dust adhere easily to the layer. Moreover, the light transmittance becomes large; thus, when the tape is running on a tape drive, an erroneous operation may be caused in detection of the terminal end of the tape.

The binder resin material of the back coat layer is not particularly limited, and may be a combination that is appropriately selected from thermoplastic resins, thermosetting or thermoreactive resins, radiation (electron beam or ultraviolet ray) curable resins and other resins in accordance with the property of the medium or conditions for the production process thereof. The electron beam curable resins or the thermosetting resins are preferably used. Out of the thermosetting resins, nitrocellulose resin and polyurethane resin are preferably used. The nitrocellulose resin is preferred for improving the running durability and keeping the magnetic layer side of the medium into a convex form.

The content of the binder resin used in the back coat layer is preferably from 50 to 200 parts by mass, more preferably from 70 to 150 parts by mass with respect to 100 parts by mass of the total of carbon black and the non-magnetic inorganic powder other than carbon black. If the content of the binder is too small, the strength of the back coat layer falls and the running durability deteriorates easily. On the other hand, if the content of the binder is too large, the content of carbon black and the non-magnetic inorganic powder other than carbon black falls. Thus, the mechanical strength tends to decrease and the light transmittance tends to increase.

The carboxylic acid amine salt used in the back coat layer coating material is generally represented by

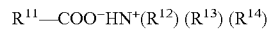

$R^{11}$—$COO^-HN^+(R^{12})(R^{13})(R^{14})$ wherein $R^{11}$, $R^{12}$, $R^{13}$ and $R^{14}$, which may be the same or different, each represent a polymer chain, or a linear or branched alkyl group. Examples of the polymer chain include polyether, polyester and polyether ester.

The phosphate amine salt used in the back coat layer coating material is generally represented by

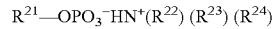

$R^{21}$—$OPO_3^-HN^+(R^{22})(R^{23})(R^{24})$ wherein $R^{21}$, $R^{22}$, $R^{23}$ and $R^{24}$, which may be the same or different, each represent a polymer chain, or a linear or branched alkyl group. Examples of the polymer chain include polyether, polyester and polyether ester.

When both of the carboxylic acid amine salt and the phosphate amine salt are incorporated into the back coat layer coating material, the dispersion properties of the back coat layer coating material and the stability with time thereof are improved so that the application properties can be kept at a constant level. As a result, the surface smoothness of the back coat layer formed by applying the coating material is improved. The reason why the incorporation of the carboxylic acid amine salt and the phosphate amine salt causes the improvement in the dispersion properties of the back coat layer coating material and the stability with time thereof would be as follows.

Specifically, the carboxylic acid amine salt is adsorbed on the surface of carbon black or the non-magnetic inorganic powder other than the carbon black, so as to act as a dispersant, whereby the dispersion properties of the back coat layer coating material would be improved. Moreover, the phosphate amine salt is also adsorbed on the surface of carbon black or the non-magnetic inorganic powder other than the carbon black, whereby the salt would mainly fulfill a function of improving the stability with time of the coating material. Accordingly, if either one of the carboxylic acid amine salt and the phosphate amine salt is not present, either one or both of the dispersion properties and the stability with time become insufficient so that desired effects cannot be obtained.

The carboxylic acid amine salt preferably has a weight-average molecular weight of 10000 to 50000. The phosphate amine salt preferably has a weight-average molecular weight of 10000 to 50000. In the case that the surface state of particles of carbon black contained in the back coat layer is considered from the area ratio between their polar faces and their nonpolar faces, the nonpolar faces usually occupy almost all. In order to disperse carbon black having such nonpolar faces satisfactorily and maintain the stability with time, it is suitable to use a dispersant having a relatively high molecular weight. It is therefore preferred that each of the carboxylic acid amine salt and the phosphate amine salt has the above-mentioned weight-average molecular weight. If the weight-average molecular weight is smaller than 10000, the polarity of the contained amine salts is intensely expressed, so that the dispersion properties tend to lower. If the weight-average molecular weight is more than 50000, the polarity of the contained amine salts is conversely expressed with difficulty so that the dispersion properties tend to lower. Each of the carboxylic acid amine salt and the phosphate amine salt more preferably has a weight-average molecular weight of 20000 to 40000.

The carboxylic acid amine salt preferably has an acid value of 10 to 50 KOHmg/g and an amine value of 10 to 50 KOHmg/g, and more preferably has an acid value and an amine value in these ranges wherein the amine value is larger than the acid value. The phosphate amine salt preferably has an acid value of 10 to 50 KOHmg/g and an amine value of 10 to 50 KOHmg/g, and more preferably has an acid value and an amine value in these ranges wherein the amine value is larger than the acid value. As described above, about the surface state of the carbon black particles contained in the back coat layer, almost all portions of the surfaces are in a nonpolar state. When polar faces which are slightly present are considered from the area ratio of their acidic faces to their basic faces, the surfaces are in a state that the ratio of the acidic faces to the basic faces is approximately one or slightly higher than one. Accordingly, in order to disperse carbon black having such a surface property satisfactorily and maintain the stability with time, each of the carboxylic acid amine salt and the phosphate amine salt is preferably a salt wherein the acid value and the amine value balance between each other (that is, a salt having an acid value of 10 to 50 KOHmg/g and an amine value of 10 to 50 KOHmg/g as described above), and is more preferably a salt having an acid value and an amine value in these ranges wherein the amine value is larger than the acid value. Each of the carboxylic acid amine salt and the phosphate amine salt more preferably has an acid value of 10 to 30 KOHmg/g and an amine value of 20 to 40 KOHmg/g.

The acid value is an index of the content of a free acid in a material, and is represented by the numerical value of milligrams of potassium hydroxide necessary for neutralizing an acidic group per gram of a (solid) material. As the indicator for measuring this value, phenolphthalein is generally used. The amine value is an index of the content in a free base in a material, and is represented by the value obtained by converting, into the numerical value of milligrams of potassium hydroxide, the mole number of the free base content (amine amount) obtained by making a basic group in one gram of a (solid) material slightly acidic by the addition of an acidic solution (for example, sulfuric acid) having an already-known concentration, neutralizing (back-titrating) the acid group newly with potassium hydroxide, and then making a calculation. As the indicator for measuring the value, phenolphthalein is generally used.

The blend amount of the carboxylic acid amine salt in the back coat layer is preferably from 2 to 10 parts by mass, more preferably from 3 to 8 parts by mass with respect to 100 parts by mass of the total of carbon black and the non-magnetic inorganic powder other than carbon black, which constitute the back coat layer. If the amount of the carboxylic acid amine salt is less than 2 parts by mass, the effect of improving the stability with time of the back coat layer coating material is not easily obtained. On the other hand, if the amount is more than 10 parts by mass, the dispersion properties and the stability with time are not made better.

The blend amount of the phosphate amine salt in the back coat layer is preferably from 1 to 8 parts by mass, more preferably from 2 to 6 parts by mass with respect to 100 parts by mass of the total of carbon black and the non-magnetic inorganic powder other than carbon black, which constitute the back coat layer. If the amount of the phosphate amine salt is less than 1 part by mass, the effect of improving the stability with time of the back coat layer coating material is not easily obtained. On the other hand, if the amount is more than 8 parts by mass, the dispersion properties and the stability with time are not made better.

Specific examples of the carboxylic acid amine salt include products manufactured by Kusumoto Chemicals Ltd. (trade names: DA-7300 and DA-7500). Two or more products of the carboxylic acid amine salt may be used in combination. A specific example of the phosphate amine salt is a product manufactured by Kusumoto Chemicals Ltd. (trade name: DA-325). Two or more products of the phosphate amine salts may be used in combination.

As described above, in the case of incorporating both of a carboxylic acid amine salt and a phosphate amine salt into a back coat layer coating material, the dispersion properties of the back coat layer coating material and the stability with time thereof are improved even when nitrocellulose resin is used as a thermosetting resin and carbon black having a relatively large particle diameter and carbon black having a relatively small particle diameter are used together as species of carbon black. As a result, the application properties of the back coat layer coating material can be kept at a fixed level. Thus, the back coat layer formed by applying the coating material has an improved surface smoothness.

The coating material for forming the back coat layer is prepared by adding an organic solvent to the above-mentioned individual components and subjecting the resultant to mixing, stirring, kneading, dispersing and other treatments in a known manner. The used organic solvent is not particularly limited, and may be the same solvent as used to form the lower non-magnetic layer.

The thickness of the back coat layer (after the layer is calendared) is no greater than 1.0 µm, preferably from 0.1 to 1.0 µm, more preferably from 0.2 to 0.8 µm. If the thickness of the back coat layer is set into more than 1.0 µm, the total thickness of the magnetic recording medium becomes large; thus, such a case should be avoided. Moreover, the performance is not improved even if the thickness is set to more than 1.0 µm.

The centerline average roughness (Ra) of the back coat layer surface is preferably from 5 to 22 nm, more preferably from 5 to 20 nm. If the Ra is less than 5 nm, the surface is too smooth. On the other hand, if the Ra is more than 22 nm, the surface is too rough so that irregularities in the surface are unfavorably transferred onto the surface of the magnetic layer. The centerline ten-point average roughness (Rz) of the back coat layer surface is preferably from 50 to 150 nm, more preferably from 50 to 120 nm.

[Non-Magnetic Support]

The material used for the non-magnetic support is not particularly limited, and may be selected from various flexible materials and various rigid materials in accordance with purpose. The material is made into a give form, such as a medium form, and a given size in accordance with various standard specifications. Examples of the flexible materials include polyesters such as polyethylene terephthalate (PET) and polyethylene naphthalate (PEN); polyolefins such as polypropylene; or various other resins such as polyamides, polyimides, and polycarbonates.

The thickness of the non-magnetic support is preferably from 2.5 to 10.0 µm. The form of the non-magnetic support is not particularly limited, and may be any one selected from tape, sheet, card, disc and other forms. In accordance with the form or necessity, various materials may be selected and used.

[Production of Magnetic Recording Medium]

In the present invention, prepared coating materials for forming the non-magnetic layer, for forming the magnetic layer, and for forming the back coat layer are used and subjected to applying, drying, calendering, curing and other treatments so as to form respective coating films (coating layers). In this way, a magnetic recording medium is produced.

In the present invention, it is preferred that the lower non-magnetic layer and the upper magnetic layer are formed in the so-called wet-on-dry coating manner. However, the layers may be formed in the wet-on-wet coating manner. In the case of the wet-on-dry coating manner, a coating material for the non-magnetic layer is first applied onto one surface of a non-magnetic support, and dried, and optionally the resultant is subjected to calendaring treatment, so as to yield an uncured lower non-magnetic layer. Thereafter, the uncured lower non-magnetic layer is cured. In the case of using an electron beam curable resin as the binder resin material of the lower non-magnetic layer, the lower non-magnetic layer is irradiated with an electron beam, so as to be cured. Next, a coating material for the magnetic layer is applied onto the cured lower non-magnetic layer, oriented and dried to form the upper magnetic layer. The timing when the back coat layer is formed may be selected at will. Specifically, the back coat layer may be formed before the formation of the lower non-magnetic layer, after the formation of the lower non-magnetic layer and before that of the upper magnetic layer, or after the formation of the upper magnetic layer.

The method used for applying the above-mentioned coating materials may be any one selected from known various coating methods such as gravure coating, reverse roll coating, die nozzle coating, and bar coating.

EXAMPLES

The present invention will be more specifically described byway of the following examples. However, the present invention is not limited to only these examples.

Examples 1-9, and Comparative Examples 1-4

(Preparation of Coating Material for Non-Magnetic Layer)

| | |
|---|---|
| Non-magnetic powder, Acicular α-$Fe_2O_3$ (average major axis length: 0.1 μm, crystallite size: 12 nm) | 80.0 parts by mass |
| Non-magnetic powder, Carbon black (trade name: #950B, manufactured by Mitsubishi Chemical Co., Ltd., average particle diameter: 17 nm, BET specific surface area: 250 $m^2$/g, DBP oil absorption: 70 mL/100 g, pH: 8) | 20.0 parts by mass |
| Electron beam curable binder, Electron beam curable vinyl chloride resin (trade name: TB-0246, manufactured by Toyobo Co., Ltd., (solid content) vinyl chloride - epoxy containing monomer copolymer, average degree of polymerization: 310, content of S based on the use of potassium persulfate: 0.6% by mass, MR110 (manufactured by Nippon Zeon Corp.) subjected to acrylic modification with 2-isocyanate ethyl methacrylate (MOI), acryl content: 6 mol/1 mol) | 12.0 parts by mass |
| Electron beam curable binder, Electron beam curable polyurethane resin (trade name: TB-0216, manufactured by Toyobo Co., Ltd., (solid content) hydroxy-containing acrylic compound - phosphonic acid group-containing phosphorus compound - hydroxy-containing polyester polyol, average molecular weight: 13,000, P content: 0.2% by mass, acryl content: 8 mol/1 mol) | 10.0 parts by mass |
| Dispersant, phosphoric acid ester (trade name: RE-610, manufactured by TOHO Chemical Industry Co., Ltd.) | 1.0 part by mass |
| Abrasive, α-alumina (trade name: HIT60A, manufactured by Sumitomo Chemical Co., Ltd., average particle diameter: 0.18 μm) | 5.0 parts by mass |

NV (Non-Volatile content) = 33% by mass

The above-mentioned materials were subjected to kneading treatment with a kneader. Thereafter, the mixture was dispersed in a lateral type pin mill, filled with zirconia beads of 0.8 mm diameter at a filling rate of 80% (percentage of voids: 50% by volume). Thereafter, to this dispersion were further added the following lubricant materials:

1.0 part by mass of lubricant; fatty acid
(trade name: NAA180, manufactured by NFO Corp.),
0.5 part by mass of lubricant; fatty acid amide
(trade name: Fatty Acid AMIDE S, manufactured by Kao Corp.) and
1.5 parts by mass of lubricant; fatty acid ester
(trade name: NIKKOLBS, manufactured by Nikko Chemicals Co., Ltd.), and the dispersion was diluted to have a NV (Non-Volatile content) of 25% by mass and the following solvent ratio by mass: MEK/toluene/cyclohexanone=2/2/1. Thereafter, the mixture was dispersed. Subsequently, the resultant coating material was filtrated through a filter having an absolute filtration precision of 3.0 μm to prepare a non-magnetic coating material.

Next, to the prepared non-magnetic coating material were added 0.2 part by mass of a hardener (COLONATE L, manufactured by Nippon Polyurethane Industry Co., Ltd.), and then they were mixed. Thereafter, the resultant was filtrated through a filter having an absolute filtration precision of 1.0 μm, so as to prepare a coating material for non-magnetic layer used in the present Examples.

(Preparation of Coating Material for Magnetic Layer)

| | |
|---|---|
| Ferromagnetic powder, Fe-based acicular ferromagnetic powder (Fe/Co/Al/Y = 100/20/3/10 (atomic ratio), Hc: 180 kA/m, σs: 135 $Am^2$/kg, BET specific surface area: 55 $m^2$/g, average major axis length: 0.09 μm) | 100.0 parts by mass |
| Binder, vinyl chloride copolymer (trade name: MR110, manufactured by Nippon Zeon Corp.) | 10.0 parts by mass |
| Binder, polyester polyurethane (trade name: UR8300, manufactured by Toyobo Co., Ltd.) | 6.0 parts by mass |
| Dispersant, phosphoric acid-based surfactant (trade name: RE610, manufactured by TOHO Chemical Industry Co., Ltd.) | 3.0 parts by mass |
| Abrasive, α-alumina (trade name: HIT60A, manufactured by Sumitomo Chemical Co., Ltd., average particle diameter: 0.18 μm) | 10.0 parts by mass |

NV (Non-Volatile content) = 30% by mass
Solvent ratio: MEK/toluene/cyclohexanone = 4/4/2 (ratio by mass)

The above-mentioned materials were subjected to kneading treatment with a kneader. Thereafter, the mixture was subjected to preparatory dispersion in a lateral type pin mill, filled with zirconia beads of 0.8 mm diameter at a filling rate of 80% (percentage of voids: 50% by volume). Next, the dispersion was diluted so as to have a NV (Non-Volatile content) of 15% by mass and the following solvent ratio by mass:

MEK/toluene/cyclohexanone=22.5/22.5/55. The mixture was then subjected to finishing dispersion. Subsequently, immediately before applying, to the resultant coating material were added 10 parts by mass of a hardener (trade name: COLONATE L, manufactured by Nippon Polyurethane Industry Co., Ltd.), and then they were mixed. Thereafter, the mixture was filtrated through a filter having an absolute filtration precision of 1.0 µm to prepare a coating material for magnetic layer.

(Preparation of Coating Material for Back Coat Layer)

| | |
|---|---|
| Carbon black (trade name: BP-880, manufactured by Cabot Corp., average particle diameter: 17 nm, BET specific surface area: 210 m$^2$/g) | 75 parts by mass |
| Carbon black (trade name: BP-130, manufactured by Cabot Corp., average particle diameter: 75 nm, DBP oil absorption: 69 mL/100 g, BET specific surface area: 25 m$^2$/g) | 10 parts by mass |
| Barium sulfate (trade name: BARIFINE BF-20, manufactured by Sakai Chemical Industry Co., Ltd., average particle diameter: 30 nm) | 15 parts by mass |
| Nitrocellulose (trade name: BTH1/2, manufactured by Asahi Kasei Corp.) | 50 parts by mass |
| Polyurethane resin (trade name: UR-8300, manufactured by Toyobo Co., Ltd., containing sodium sulfonate) | 40 parts by mass |
| Dispersant 1 (the following carboxylic acid amine salt A or B) | part by mass shown in Table 1 |
| Dispersant 2 (the following phosphate amine salt C) | part by mass shown in Table 1 |
| Methyl ethyl ketone MEK | 200 parts by mass |
| Toluene | 200 parts by mass |
| Cyclohexanone | 170 parts by mass |

Carboxylic acid amine salt A: trade names: DA-7300, manufactured by Kusumoto Chemicals Ltd., acid value: 15 KOHmg/g, amine value: 40 KOHmg/g, weight-average molecular weight: 15,000 to 30,000
Carboxylic acid amine salt B: trade names: DA-7500, manufactured by Kusumoto Chemicals Ltd., acid value: 30 KOHmg/g, amine value: 40 KOHmg/g, weight-average molecular weight: 15,000 to 30,000
Phosphate amine salt C: trade names: DA-325, manufactured by Kusumoto Chemicals Ltd., acid value: 14 KOHmg/g, amine value: 20 KOHmg/g, weight-average molecular weight: 20,000 to 35,000

In each of Examples 1 to 9 and Comparative Examples 1 to 4, about the dispersants 1 and 2, the above-mentioned carboxylic acid amine salt A or B, and the phosphate amine salt C were added, respectively, in a kind shown in Table 1 at parts by mass shown in Table 1.

Each of the above-mentioned compositions was sufficiently kneaded by means of a kneader, and then the composition was dispersed in a sand grinding mill for 5 hours. Thereafter, materials described below were incorporated into the composition, and further the resultant was dispersed for 1 hour.

| | |
|---|---|
| Methyl ethyl ketone | 350 parts by mass |
| Toluene | 350 parts by mass |
| Cyclohexanone | 100 parts by mass |

In the above-mentioned way, each back coat layer coating material (I) was prepared.

The prepared back coat layer coating material (I) was allowed to stand still for one week. To the back coat layer coating material (I) after the one week were added 15 parts by mass of a hardener (trade name: COLONATE L, manufactured by Nippon Polyurethane Industry Co., Ltd.) immediately before the coating material was applied. The components were mixed, and the resultant coating material was further filtrated through a filter having an absolute filtration precision of 1.0 µm, so as to yield a final back coat layer coating material used in each of Examples 1 to 9 and Comparative Examples 1 to 4.

(Step of Forming Non-Magnetic Layer)

The coating material for non-magnetic layer was applied onto one surface of a PEN base film of 6.2 µm thickness by extrusion coating method using a nozzle, so as to make the thickness of the applied coating material after the following calendering into 2.0 µm. The coating was dried, and subsequently the resultant layer was calendered with a calender composed of combinations of a plastic roll with a metal roll under the following conditions: the nip number: 4, working temperature: 100° C., linear pressure: 3500 N/cm, and velocity: 150 m/min. Furthermore, the resultant was irradiated with electron beams at a dose of 4.0 Mrad, so as to form a non-magnetic layer.

(Step of Forming Magnetic Layer)

The coating material for magnetic layer was applied from a nozzle onto the non-magnetic layer formed as described above so as to make the thickness of the applied coating material after the following calendering into 0.15 µm. The coating was oriented and dried, and subsequently the resultant layer was calendered with a calender composed of combinations of a plastic roll with a metal roll under the following conditions: the nip number: 4, working temperature: 100° C., linear pressure: 3500 N/cm, and velocity: 150 m/min, so as to form a magnetic layer.

(Step of Forming Back Coat)

Each coating material for back coat layer was applied from a nozzle onto the other surface of the PEN base film so as to make the thickness of the applied coating material after the following calendaring into 0.7 µm. The coating was dried, and subsequently the resultant layer was calendered with a calender composed of combinations of a plastic roll with a metal roll under the following conditions: the nip number: 4, working temperature: 90° C., linear pressure: 2100 N/cm, and velocity: 150 m/min, so as to form a back coat layer.

The PEN base film experienced the finishing of the above-mentioned successive treatments was wounded around a wind-up roll, and then the base film was allowed to stand still in a rolled state for 24 hours. Thereafter, the base film was subjected to thermal curing treatment at 60° C. for 48hours. Next, the resultant was slit into a width of ½ inch (=12.650 mm), thereby producing a magnetic tape sample as each of Examples 1 to 9 and Comparative Examples 1 to 4.

[Evaluation of the Back Coat Coating Materials and the Magnetic Tapes]

The back coat layer coating material and the magnetic tape sample in each of Examples 1 to 9 and Comparative Examples 1 to 4 were tested and evaluated in accordance with each method described below about the following: the dispersion properties of the back coat coating material and the stability with time thereof, the back coat layer surface roughness in the magnetic tape sample, the coefficient of durable-running friction of the back coat layer, and the error rate of the magnetic tape.

(Measurement of the Dispersion Properties of the Back Coat Layer Coating Materials, and the Stability with Time Thereof)

Immediately after the back coat layer coating material (I) of each of Examples 1 to 9 and Comparative Examples 1 to 4 was produced, the coating material, to which no hardener was added, was put into a closed vessel. The coating material was preserved at room temperature for one week in the state that the vessel was allowed to stand still. Before and after the preservation, the coating material was evaluated about the following two items.

(1) Measurement of Gloss:

A small amount of each of the back coat coating materials was dropped onto a smooth glass plate. An applicator having a gap of 25 μm was used to form a coating film in a simple way. The resultant was allowed to stand still so as to cause the coating material not to drop, thereby drying the coating film. The gloss of this coating film was measured. The used gloss meter was a "GM-3D gloss meter" manufactured by Murakami Color research Laboratory Co., Ltd. The used measuring method was in accordance with JIS-Z-8741 (measuring angle: angle of incidence/angle of reflection–60°/60°). An attached reference plate was used to calibrate into an indication value (92.1%), and then the gloss was measured.

The initial gloss (%) of the coating material before the preservation and the gloss (%) of the coating material after the preservation for one week were measured, and a gloss fall Δ (point) was obtained from the following equation:

Gloss fall (point)=(Initial gloss)–(Gloss after the preservation for one week)

(2) Measurement of Viscosity:

About each of the back coat coating materials, the initial viscosity (mPa·sec) before the preservation, and viscosity (mPa·sec) after the preservation for one week were measured.

(Coating Material Temperature: 24-26° C.)

Viscometer: B type viscometer (manufactured by Tokyo Keiki Co., Ltd.), H rotor No. 1, 100 rpm The viscosity increase rate was obtained from the following equation:

Viscosity increase rate=(Viscosity after the preservation for one week)/(Initial viscosity)

(Measurement of the Back Coat Layer Surface Roughness)

The surface roughnesses Ra (nm) and RZ (nm) of each of the back coat layers were measured in accordance with JIS B 0601-1994.

Talystep manufactured by Talar-Hobson was used, and a cutoff filter was used to make the measurement in the range of 3.3 to 167 μm.

(Measurement of the Coefficient of Durable-Running Friction of the Back Coat Layer)

Each of the tapes, which had a width of ½ inch, was brought into contact with the periphery of a columnar SUS pin having a diameter of 2 mm over ¼ of the circumferential length (90°), and then the tape was run so as to give 300 reciprocating motions under conditions of a rate of 30 mm/sec., and a loading of 50 g at room temperature. In the 300th reciprocating motion, the coefficient of dynamic friction μk was measured.

(Measurement of the Error Rate of the Magnetic Tape)

About each of the magnetic tape samples integrated into a cartridge, the error rate thereof was measured by means of a drive manufactured by Hewlett Packard (product name: Ultrium 460e).

In the measurement, an SCSI control software was used to record about 8 Gbit of random data from beginning of data area of the tape, and then read the data. At this time, the number of correctable C1 errors extracted through the SCSI software was converted into the number of bits. The rate of the number of the C1 error bits to the total number of the written bits was used as the error rate.

The results are shown in Table 1.

TABLE 1

| | Back coat coating material | | | | | | | |
|---|---|---|---|---|---|---|---|---|
| | Dispersant 1 | | Dispersant 2 | | Gloss | | | Viscosity |
| | Kind | Amount of addition part by mass | Kind | Amount of addition part by mass | Initial % | After one week % | Gloss fall point | Initial mPa·s |
| Example 1 | A | 2 | C | 1 | 137 | 135 | Δ2 | 33.0 |
| Example 2 | A | 10 | C | 1 | 139 | 138 | Δ1 | 34.0 |
| Example 3 | A | 3 | C | 2 | 137 | 137 | Δ0 | 33.0 |
| Example 4 | B | 3 | C | 2 | 136 | 136 | Δ0 | 33.0 |
| Example 5 | A | 8 | C | 2 | 138 | 138 | Δ0 | 33.0 |
| Example 6 | A | 3 | C | 6 | 137 | 137 | Δ0 | 33.0 |
| Example 7 | A | 8 | C | 6 | 138 | 138 | Δ0 | 33.0 |
| Example 8 | A | 2 | C | 8 | 137 | 137 | Δ0 | 33.0 |
| Example 9 | A | 10 | C | 8 | 138 | 138 | Δ0 | 34.0 |
| Comparative Example 1 | A | 2 | — | — | 137 | 127 | Δ10 | 32.0 |
| Comparative Example 2 | A | 10 | — | — | 140 | 133 | Δ7 | 33.0 |
| Comparative Example 3 | — | — | C | 1 | 130 | 125 | Δ5 | 28.0 |
| Comparative Example 4 | — | — | C | 8 | 133 | 133 | Δ0 | 30.0 |

TABLE 1-continued

| | Back coat coating material Viscosity | | Magnetic tape sample | | | | |
|---|---|---|---|---|---|---|---|
| | | | Back coat layer | | | | |
| | After one week mPa·s | Viscosity increase rate | Ra nm | Rz nm | Coefficient of durable-running friction | Error rate bER | Comprehensive evaluation |
| Example 1 | 38.0 | 1.15 | 18 | 135 | 0.23 | $2.0 \times 10^{-7}$ | A |
| Example 2 | 37.5 | 1.10 | 15 | 120 | 0.23 | $1.3 \times 10^{-7}$ | A |
| Example 3 | 35.0 | 1.06 | 14 | 115 | 0.23 | $5.0 \times 10^{-8}$ | AA |
| Example 4 | 35.0 | 1.06 | 15 | 115 | 0.23 | $5.0 \times 10^{-8}$ | AA |
| Example 5 | 35.0 | 1.06 | 14 | 110 | 0.23 | $5.0 \times 10^{-8}$ | AA |
| Example 6 | 33.0 | 1.00 | 15 | 115 | 0.23 | $5.0 \times 10^{-8}$ | AA |
| Example 7 | 33.0 | 1.00 | 14 | 110 | 0.23 | $5.0 \times 10^{-8}$ | AA |
| Example 8 | 33.0 | 1.00 | 18 | 130 | 0.25 | $2.0 \times 10^{-7}$ | A |
| Example 9 | 34.0 | 1.00 | 14 | 110 | 0.25 | $1.3 \times 10^{-7}$ | A |
| Comparative Example 1 | 96.0 | 3.00 | 30 | 300 | 0.35 | $5.0 \times 10^{-6}$ | B |
| Comparative Example 2 | 66.0 | 2.00 | 25 | 200 | 0.25 | $1.0 \times 10^{-6}$ | B |
| Comparative Example 3 | 40.5 | 1.45 | 60 | 600 | 0.40 | $1.0 \times 10^{-5}$ | B |
| Comparative Example 4 | 31.5 | 1.05 | 30 | 300 | 0.25 | $5.0 \times 10^{-6}$ | B |

Comprehensive evaluation in Table 1
AA: very good
A: good
B: not good

As is clear from Table 1, the dispersion properties of the back coat layer coating material used in each of Examples 1 to 9 and the stability with time thereof were good, and each of the produced magnetic tape samples was excellent in the surface smoothness of its back coat layer and in durability. Accordingly, in particular, about the magnetic tape sample of each of Examples 3 to 7, the error rate was a very good result of $5.0 \times 10^{-8}$.

In Comparative Examples 1 and 2, the back coat layer coating material deteriorated remarkably with time since no phosphate amine salt was used. Each of the produced magnetic tape samples was poor in the surface smoothness of its back coat layer. Accordingly, the error rate, which was poor, was $5.0 \times 10^{-6}$ (Comparative Example 1), or $1.0 \times 10^{-6}$ (Comparative Example 2).

In Comparative Examples 3 and 4, the dispersion properties were not good, as is understood from a matter that the initial gloss of Comparative Example 3 was 130% and that of Comparative Example 4 was 133% since no carboxylic acid amine salt was used. Each of the produced magnetic tape samples was poor in the surface smoothness of its back coat layer. Accordingly, the error rate, which was poor, was $1.0 \times 10^{-5}$ (Comparative Example 3), or $5.0 \times 10^{-6}$ (Comparative Example 4).

What is claimed is:

1. A magnetic recording medium, comprising at least a non-magnetic support, a lower non-magnetic layer on one surface of the non-magnetic support, an upper magnetic layer on the lower non-magnetic layer, and a back coat layer on the other surface of the non-magnetic support,
    wherein the lower non-magnetic layer contains at least carbon black, a non-magnetic inorganic powder other than carbon black, and a binder resin material,
    the upper magnetic layer contains at least a ferromagnetic powder, and a binder resin material, and
    the back coat layer contains at least carbon black, a non-magnetic inorganic powder other than carbon black, a carboxylic acid amine salt, a phosphate amine salt, and a binder resin material.

2. The magnetic recording medium according to claim 1, wherein the back coat layer contains 2 to 10 parts by mass of the carboxylic acid amine salt and 1 to 8 parts by mass of the phosphate amine salt, with respect to 100 parts by mass of the total of carbon black and the non-magnetic inorganic powder other than carbon black which constitute the back coat layer.

3. The magnetic recording medium according to claim 1, wherein the carboxylic acid amine salt has a weight-average molecular weight of 10,000 to 50,000.

4. The magnetic recording medium according to claim 1, wherein the phosphate amine salt has a weight-average molecular weight of 10,000 to 50,000.

5. The magnetic recording medium according to claim 1, wherein the carboxylic acid amine salt has a weight-average molecular weight of 10,000 to 50,000 and the phosphate amine salt has a weight-average molecular weight of 10,000 to 50,000.

6. The magnetic recording medium according to claim 1, wherein the carboxylic acid amine salt has an acid value of 10 to 50 KOHmg/g and an amine value of 10 to 50 KOHmg/g.

7. The magnetic recording medium according to claim 1, wherein the phosphate amine salt has an acid value of 10 to 50 KOHmg/g and an amine value of 10 to 50 KOHmg/g.

8. The magnetic recording medium according to claim 1, wherein the carboxylic acid amine salt has an acid value of 10 to 50 KOHmg/g and an amine value of 10 to 50 KOHmg/g, and the phosphate amine salt has an acid value of 10 to 50 KOHmg/g and an amine value of 10 to 50 KOHmg/g.

9. The magnetic recording medium according to claim 1, wherein the carboxylic acid amine salt is represented by

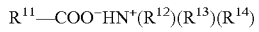

$$R^{11}\text{—COO}^-\text{HN}^+(R^{12})(R^{13})(R^{14})$$

where $R^{11}$, $R^{12}$, $R^{13}$ and $R^{14}$, which may be the same or different, each represents a polymer chain, or a linear or branched alkyl group.

10. The magnetic recording medium according to claim 1, wherein the phosphate amine salt is represented by $$R^{21}\text{—}OPO_3^-HN^+(R^{22})(R^{23})(R^{24})$$

where $R^{21}$, $R^{22}$, $R^{23}$ and $R^{24}$, which may be the same or different, each represents a polymer chain, or a linear or branched alkyl group.

11. The magnetic recording medium according to claim 1, wherein the carboxylic acid amine salt is represented by $$R^{11}\text{—}COO^-HN^+(R^{12})(R^{13})(R^{14})$$

where $R^{11}$, $R^{12}$, $R^{13}$ and $R^{14}$, which may be the same or different, each represents a polymer chain, or a linear or branched alkyl group; and the phosphate amine salt is represented by $$R^{21}\text{—}OPO_3^-HN^+(R^{22})(R^{23})(R^{24})$$

where $R^{21}$, $R^{22}$, $R^{23}$ and $R^{24}$, which may be the same or different, each represents a polymer chain, or a linear or branched alkyl group.

* * * * *